(12) United States Patent
Abushik et al.

(10) Patent No.: US 9,854,090 B2
(45) Date of Patent: Dec. 26, 2017

(54) MANAGING PHONE NUMBERS IN A TELEPHONY SYSTEM

(71) Applicant: RingCentral, Inc., San Mateo, CA (US)

(72) Inventors: Pavel Aleksandrovich Abushik, Saint-Petersburg (RU); Niels Holgerovich Oya, Saint-Petersburg (RU); Natalia Sergeevna Pavlova, Cherepovets (RU); Evgeniya Ivanovna Bachevskaya, Saint-Petersburg (RU); Alexey Dmitrievich Tarkhin, Saint-Petersburg (RU); Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 471 days.

(21) Appl. No.: 14/687,678

(22) Filed: Apr. 15, 2015

(65) Prior Publication Data

US 2016/0072953 A1    Mar. 10, 2016

Related U.S. Application Data

(63) Continuation of application No. PCT/IB2014/002288, filed on Sep. 9, 2014.

(51) Int. Cl.
*H04M 3/22* (2006.01)
*H04M 3/42* (2006.01)

(52) U.S. Cl.
CPC .... *H04M 3/42144* (2013.01); *H04M 3/42297* (2013.01)

(58) Field of Classification Search
CPC ............... H04L 65/1096; H04M 3/54; H04M 2203/152; H04M 2203/154; H04M 2203/306
USPC .............................. 379/211.02, 32.01, 32.05
See application file for complete search history.

(56) References Cited

U.S. PATENT DOCUMENTS

| 8,090,840 | B2 | 1/2012 | Jackson |
| 8,416,923 | B2 * | 4/2013 | Lawson ................. H04M 3/30 379/32.04 |
| 8,442,862 | B2 * | 5/2013 | Lieberman ............ G06Q 30/02 705/14.13 |
| 8,830,878 | B1 | 9/2014 | van Rensburg |
| 2006/0126810 | A1 | 6/2006 | Wilson et al. |
| 2008/0298576 | A1 | 12/2008 | Tashiro et al. |
| 2011/0119276 | A1 | 5/2011 | Borghetti et al. |

OTHER PUBLICATIONS

U.S. Notice of Allowance dated Jun. 24, 2014, issued in U.S. Appl. No. 14/231,446.

* cited by examiner

*Primary Examiner* — Fan Tsang
*Assistant Examiner* — Jirapon Intavong
(74) *Attorney, Agent, or Firm* — Weaver Austin Villeneuve & Sampson LLP

(57) ABSTRACT

Techniques are described for managing phone numbers associated with a telephony system to reduce the likelihood that calls or transmissions directed to a subscriber or endpoint to which a phone number was previously assigned are received by a new subscriber or endpoint to which that number is reassigned.

20 Claims, 6 Drawing Sheets

MANAGING PHONE NUMBERS IN A TELEPHONY SYSTEM

CROSS REFERENCE TO RELATED APPLICATIONS

The present application is a continuation of and claims priority under 35 U.S.C. 120 to International Application No. PCT/IB2014/002288 entitled Managing Phone Numbers in a Telephony System filed on Sep. 9, 2014 (Attorney Docket No. RINGP010WO), the entire disclosure of which is incorporated herein by reference for all purposes.

FIELD

The present disclosure relates to communications systems, and particularly, to telephony services.

BACKGROUND

Providers of telephony services maintain a pool of phone numbers that are assigned to endpoints associated with their subscribers and accounts. These phone numbers may be reassigned when, for example, a subscriber's subscription is terminated or when an endpoint associated with an account is repurposed, replaced, or eliminated. Before reassigning a phone number, most service providers quarantine the number for a period of time (e.g., six months) to allow for the number to become disassociated with the former endpoint or subscriber. During this quarantine period, calling parties are typically notified that the number is no longer in service. Once the quarantine period ends, the number is placed back in the pool of phone numbers and made available for reassignment. The basic premise of this approach is that passage of the quarantine period in combination with the notification of callers during the quarantine period makes it less likely that the new subscriber to which the number is reassigned will receive calls intended for the former subscriber.

While this approach may reduce the likelihood that calls intended for one party are received by another, it is often ineffective. That is, the quarantine period is sometimes not long enough to ensure that all parties who might call the previous subscriber become aware of the change. This results in connections being made that are frustrating and disruptive to both the calling party and the new subscriber. Telephony service providers can increase the quarantine period to further reduce the likelihood of such connections. However, there is an ongoing cost to the provider for maintaining control of each phone number that cannot be recouped during the period when the number is quarantined.

In addition to the fact that conventional quarantine does not provide a high level of confidence that a phone number can be reassigned without undesirable connections being made, considerable resources are consumed in terms of the administrative personnel required to manually manage the quarantine and reassignment of numbers.

DETAILED DESCRIPTION

Figure 1:
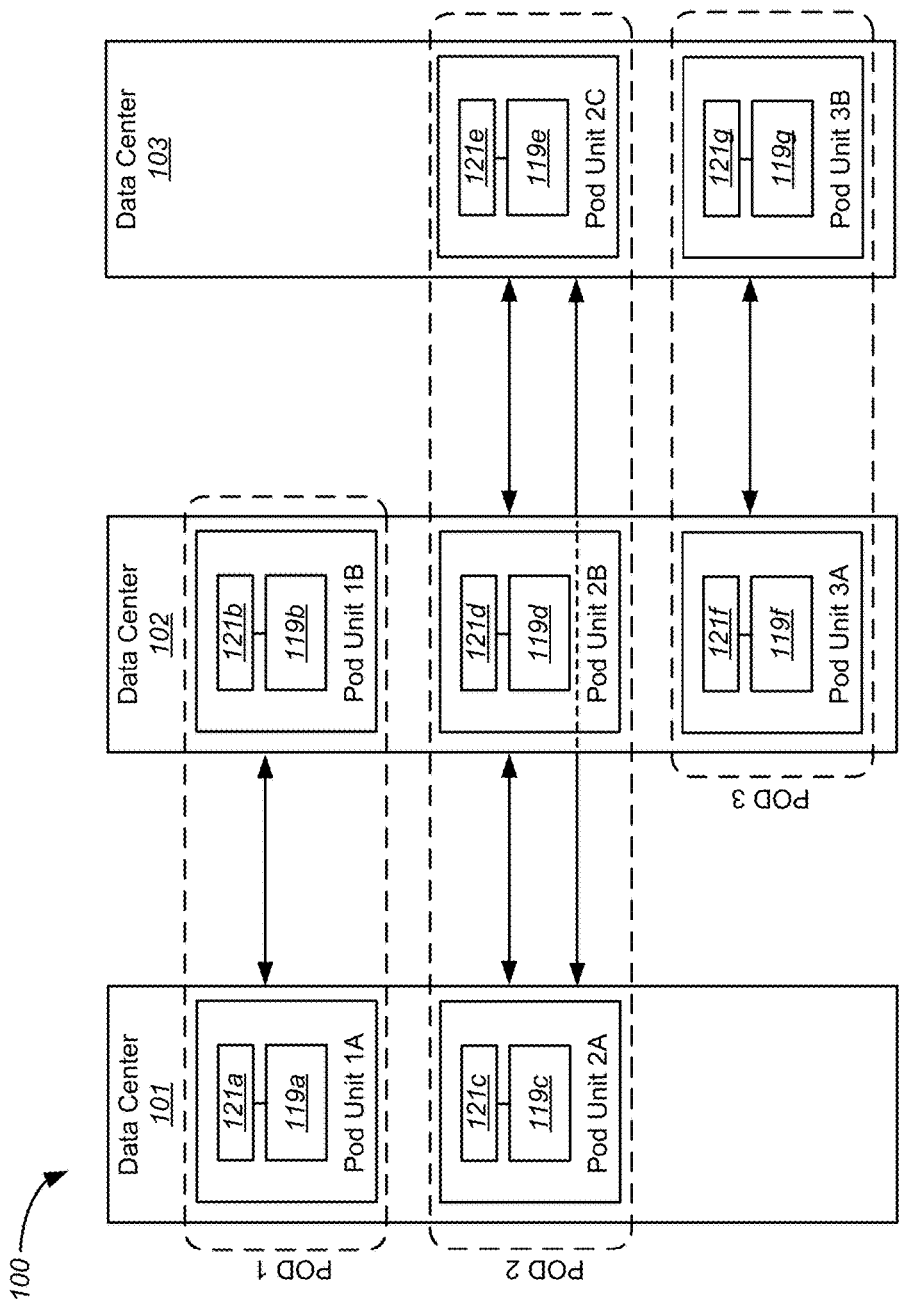
FIGS. 1 and 2 are simplified diagrams of an example of a communication system in which various implementations described herein may be practiced.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Methods, systems, and computer program products are provided herein for managing phone numbers associated with endpoints in telephony systems. According to various implementations, calls received by a telephony system that are directed to a first phone number associated with the telephony system are counted; the first phone number having been placed in quarantine for a first quarantine period. A plurality of call attempts are caused to be made to the first phone number from one or more test phone numbers. Where a first number of the calls received is below a threshold, a second number of the call attempts are successfully routed to the telephony system, and the first quarantine period for the first phone number has expired, the first phone number is designated as available for reassignment in the telephony system.

According to some implementations, calls received by the telephony system that are directed to a second phone number associated with the telephony system are counted; the second phone number having been placed in quarantine for the first quarantine period. Counting the calls directed to the second phone number includes counting a first subset of the calls directed to the second phone number during a first portion of a first period of time, and counting a second subset of the calls directed to the second phone number during a second portion of the first period. The second portion of the first period is later than the first portion of the first period. A third number of the calls received during the first portion of the first period is compared with a first threshold. A fourth number of the calls received during the second portion of the first period is compared with a second threshold. The second threshold is lower than the first threshold.

According to more specific implementations, where the third number exceeds the first threshold or the fourth number exceeds the second threshold, the counting of the calls directed to the second phone number is repeated after an interval of time. According to a more specific implementation, after repeating the counting of the calls directed to the second phone number a specified number of times, a notification to a representative of the telephony system is generated.

According to other specific implementations, where the third number is below the first threshold and the fourth number is below the second threshold, a plurality of call attempts are caused to be made to the second phone number from the one or more test phone numbers.

According to some implementations, the counting of the calls directed to the first phone number begins a specified period of time before an end of the first quarantine period.

According to some implementations, the second number of the call attempts successfully routed to the telephony system are consecutive.

According to some implementations, a plurality of call attempts are caused to be made to a second phone number associated with the telephony system from the one or more test phone numbers; the second phone number having been placed in quarantine for the first quarantine period. Where the second number is not reached within a third number of the call attempts to the second phone number, terminating the call attempts to the second phone number.

According to some implementations, a plurality of call attempts are caused to be made to a second phone number associated with the telephony system from the one or more test phone numbers; the second phone number having been placed in quarantine for the first quarantine period. Where a specified pattern of successful and unsuccessful call attempts to the second phone number occurs, a notification to a representative of the telephony system is generated.

A further understanding of the nature and advantages of various implementations may be realized by reference to the remaining portions of the specification and the drawings.

This disclosure describes techniques for managing phone numbers associated with a telephony system to reduce the likelihood that calls or transmissions directed to a subscriber or endpoint to which a phone number was previously assigned are received by a new subscriber or endpoint to which that number is reassigned. Automated checks are performed for phone numbers that have been quarantined that, if successfully completed, significantly reduce the likelihood of undesired connections to reassigned numbers; particularly relative to systems that rely primarily on the expiration of a quarantine period. For example, one check automatically tracks calls directed to a phone number after it has been released from an account to determine whether the number is "clean" or "dirty;" labels that represent the likelihood of undesired connections. In another example, a check automatically determines whether the number is still available for reassignment within the telephony system, i.e., whether the number is "good" or "bad." Further, these checks are configurable in a number of ways that allow for the customization of phone number management to meet the needs of specific systems and applications and/or the requirements of one or more providers. If a phone number has been determined to be both "clean" and "good," and the quarantine period for that number has expired, it can be designated for reassignment within the telephony system.

FIG. 1 shows an example of a communication system 100 in which phone number management as described herein may be implemented. System 100 can be, for example, a telephony system such as a hosted Private Branch Exchange (PBX) platform that provides voice and video over IP, fax services, etc. Communication system 100 includes data centers 101, 102, and 103. Each data center is a point of presence (POP) that includes the network computing resources (e.g., servers, routers, switches, network connections, storage devices, etc.) necessary to support the services provided by communication system 100. Each data center is typically located in a different geographical region.

In the depicted example, communication system 100 includes three user points of data (pods), i.e., pods 1, 2 and 3, each of which is a logical grouping of two or more pod units situated in different data centers. Each pod serves a different subset of user accounts. In this example, each pod unit (e.g., unit 2A) serves the same subset of users as the other pod units within the same pod (e.g., pod units 2B and 2C). Each pod unit includes a communication server 119a-119g configured to provide substantially the same services to the same subset of users as the other pod units within the same pod. Each pod unit also includes an account database 121a-121g configured to support the respective communication servers for the corresponding subset of users. It should be noted that the term "user" is being used in the interest of brevity and may refer to any of a variety of entities that may be associated with a subscriber account such as, for example, a person, an organization, an organizational role within an organization, a group within an organization, etc.

Figure 2:
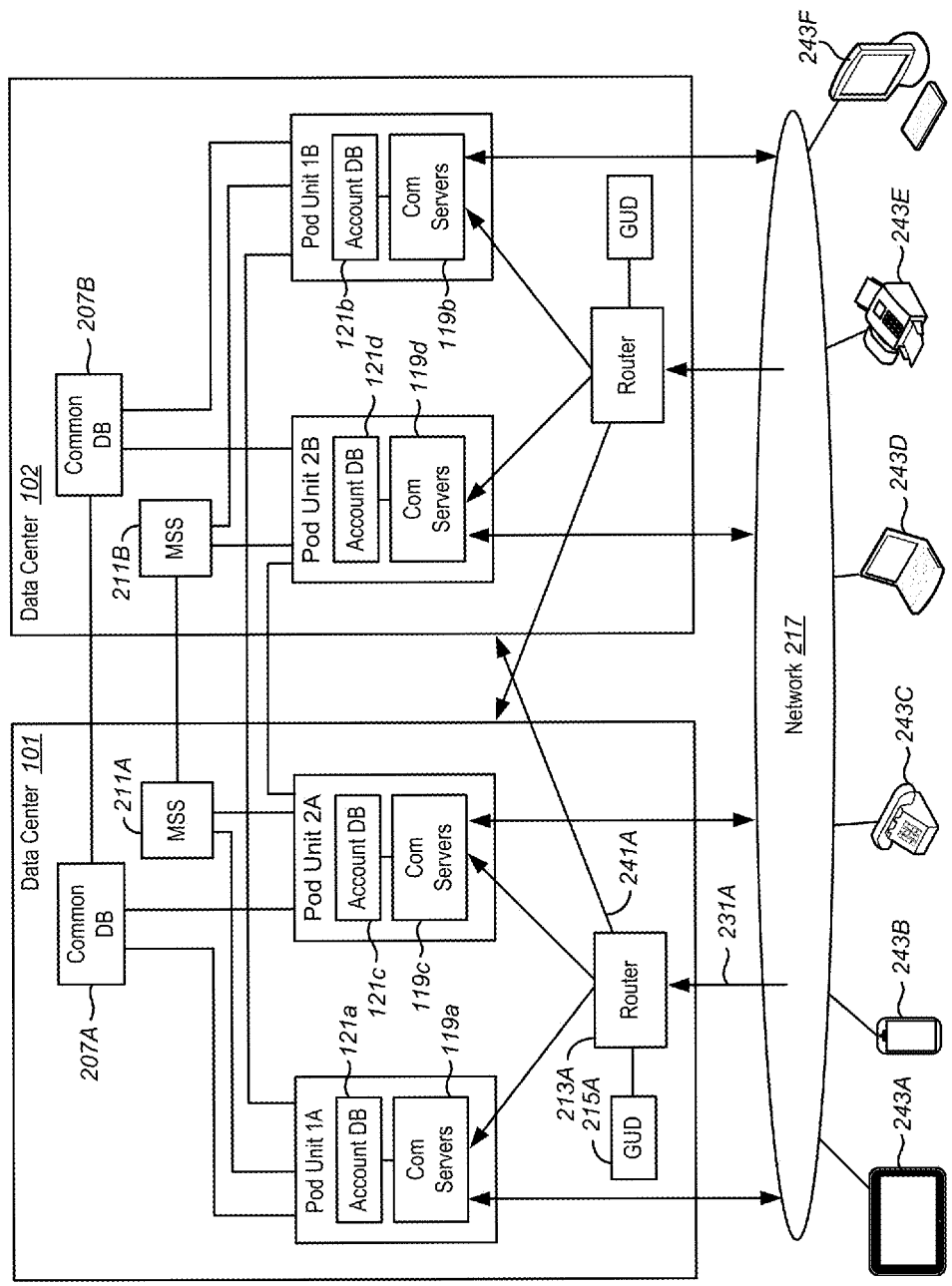

FIG. 2 shows various components of communication system 100 of FIG. 1. Specifically, FIG. 2 shows the various interconnections within and between data centers 101 and 102. Both data centers are in communication with network 217. Service requests from various communication devices 243A-243F are routed through network 217 to either or both of the data centers. Devices 243A-243F represent a diversity of client devices that connect with a services system designed in accordance with one or more implementations as described herein. Such client devices include, for example (and without limitation), cell phones, smart phones, tablets, laptop and desktop computers, conventional telephones, IP phones, teleconferencing devices, videoconferencing devices, set top boxes, gaming consoles, etc. Reference to specific client device types should therefore not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that operate substantially the same as those in data center 101. Data centers 101 and 102 provide backup and redundancy to one another in the event of failure.

Communication servers 119 provide telecommunication services (e.g., voice, video, email, and/or facsimile) to corresponding subsets of users. Each server 119 may also provide other services including, for example, user account management and configuration, billing services, accounting services, etc. Each pod unit includes an account database 121 to support the communication server(s) for that particular pod unit, storing configuration details and other information regarding each user's account.

Pod units 1A and 1B are in communication with one another so that the data on their respective account databases are synchronized across data centers. Data center 101 includes router 213A to receive an incoming service request 231A from network 217. Router 213A parses the incoming service request to identify or extract a user key and queries GUD 215A to determine which pod is associated with the user key. Once the associated pod has been identified router 213A routes the service request to the pod unit in the data center associated with the identified pod. If the pod unit associated with the identified pod is not associated with data center 101, router 213A may route the service request to another data center (e.g., data center 102 as indicated by the arrow 241A).

Each pod unit of the data center 101 is also coupled to MSS 211A which stores files for the users served by pod units 1A and 2A. These files may include, for example, messages (e.g., voicemails and facsimiles), user logs, system messages, system and user call prompts (e.g., auto-attendant or user-recorded greetings), and other types of call-related or electronic messages. The contents of MSS 211A are synchronized with other data centers (e.g., synchronized with MSS 211B of data center 102).

Each pod unit in data center 101 is coupled to common database 207A which stores shared data for all of the pods, and stores consolidated information from account databases 121. Common database 207A also facilitates changes to the pod databases. For example, common database 207A may store data for applications that provide the services on communication servers 119. Different versions of the applications data may be stored in common database 207A which allow changes and upgrades to communication servers 119 to be implemented efficiently and conveniently. Changes may be made to common database 207A and propagated to pod units 1A and 2A. Common database 207A is synchronized across data centers to other common databases (e.g., common database 207B of data center 102). Common database 207A, MSS 211A, router 213A, and GUD 215A form a common layer of resources that are shared by all pod units in data center 101.

Figure 3:
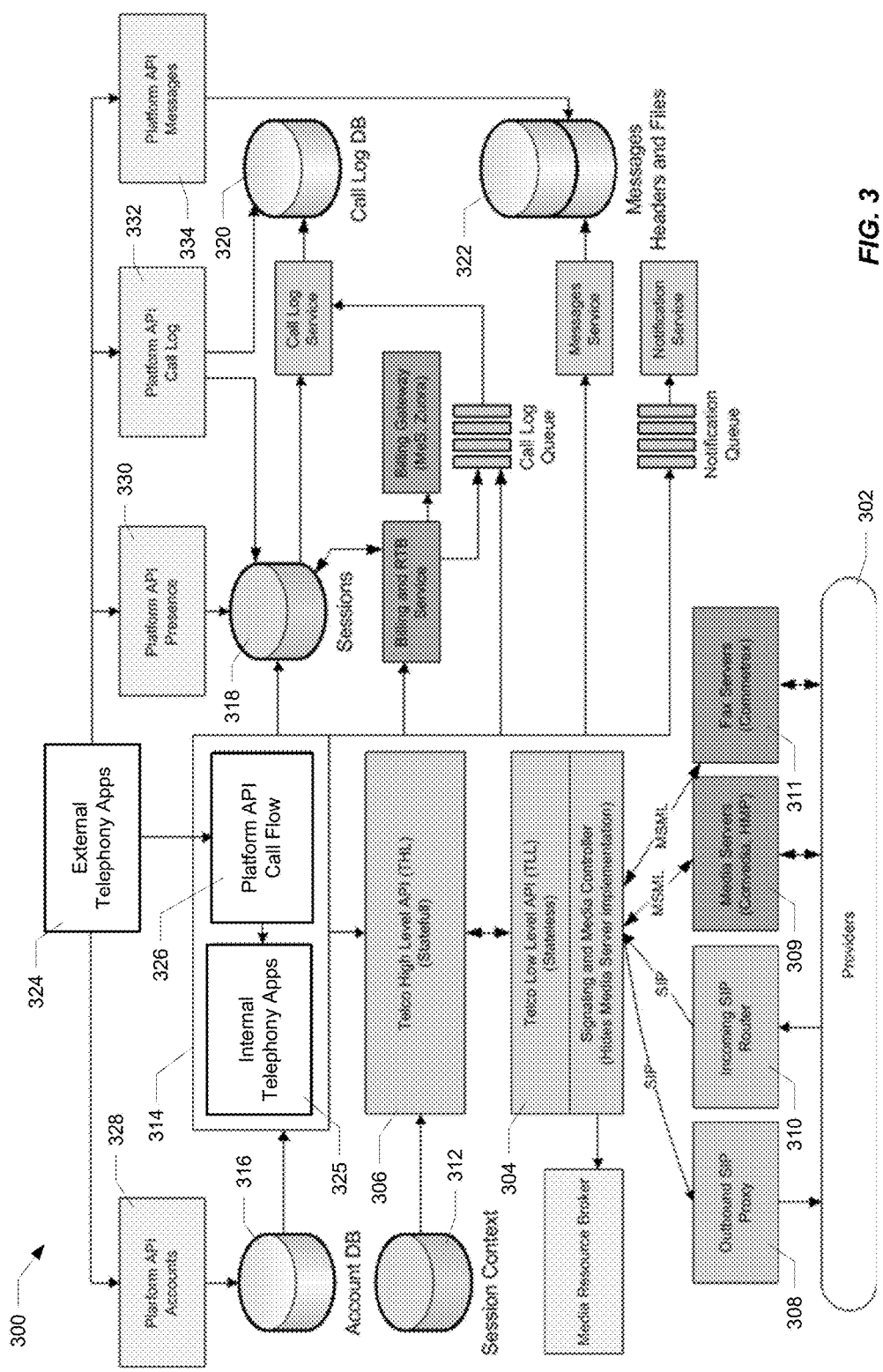
FIG. 3 is a simplified block diagram of an example of a telephony services platform employing techniques as described herein.

FIG. 3 is a simplified block diagram of an example of a PBX platform (e.g., communication system 100 of FIGS. 1 and 2) employing phone number management techniques as described herein. PBX platform 300 provides telephony services that allow communication among its users, and between its users and users associated with a variety of external telephony platforms 302 via telecommunication APIs 304 and 306, Outbound SIP Proxy 308, and Incoming SIP Router 310. Media Servers 309 and Fax Servers 311 provide functionality for processing voice over IP and fax over IP data, respectively. Telco API 304 is a stateless low-level API that provides signaling and media telephony primitives including, for example, call answering, placing of outbound calls, creation of conference call objects, addition of calls to conference call objects, playback of media for active calls, recording of active calls, etc. Telco API 306 is a higher-level API that has more sophisticated functionality such as, for example, interactive voice response (IVR), call forwarding, voice mail, etc. In the depicted implementation, telco API 306 doesn't have access to the PBX platforms databases, but maintains session context data 312 to support its functionality. Telco API 306 may include function primitives which can be used to support the development of telephony applications.

Outbound SIP Proxy 308, and Incoming SIP Router 310 employ the Session Initiation Protocol (SIP), an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems configured as shown in and described above with reference to FIGS. 1 and 2.

The core functionality of PBX platform 300 (e.g., as described above with reference to FIGS. 1 and 2) is accessed via telephony services block 314 which has access (not entirely shown for clarity) to the various data repositories of PBX platform 300, e.g., account DB 316, sessions DB 318, call log DB, 320 and message DB 322. Telephony services block 314 receives commands from telephony applications 324 and controls execution of the commands on the PBX platform 300. Telephony services block 314 may also include internal telephony applications 325 that are hosted and/or developed on or in connection with PBX platform 300. The depicted implementation also includes various APIs that allow external telephony applications 324 to interact with PBX platform 300. The APIs associated with PBX platform 300 allow telephony applications 324 and 325 to integrate with basic functionality of PBX platform 300 at multiple integration points, to control call flows during execution of the call flows by the platform (e.g., via API 326), and to access platform data (e.g., in DBs 316-322 via APIs 328-334).

Figure 4:
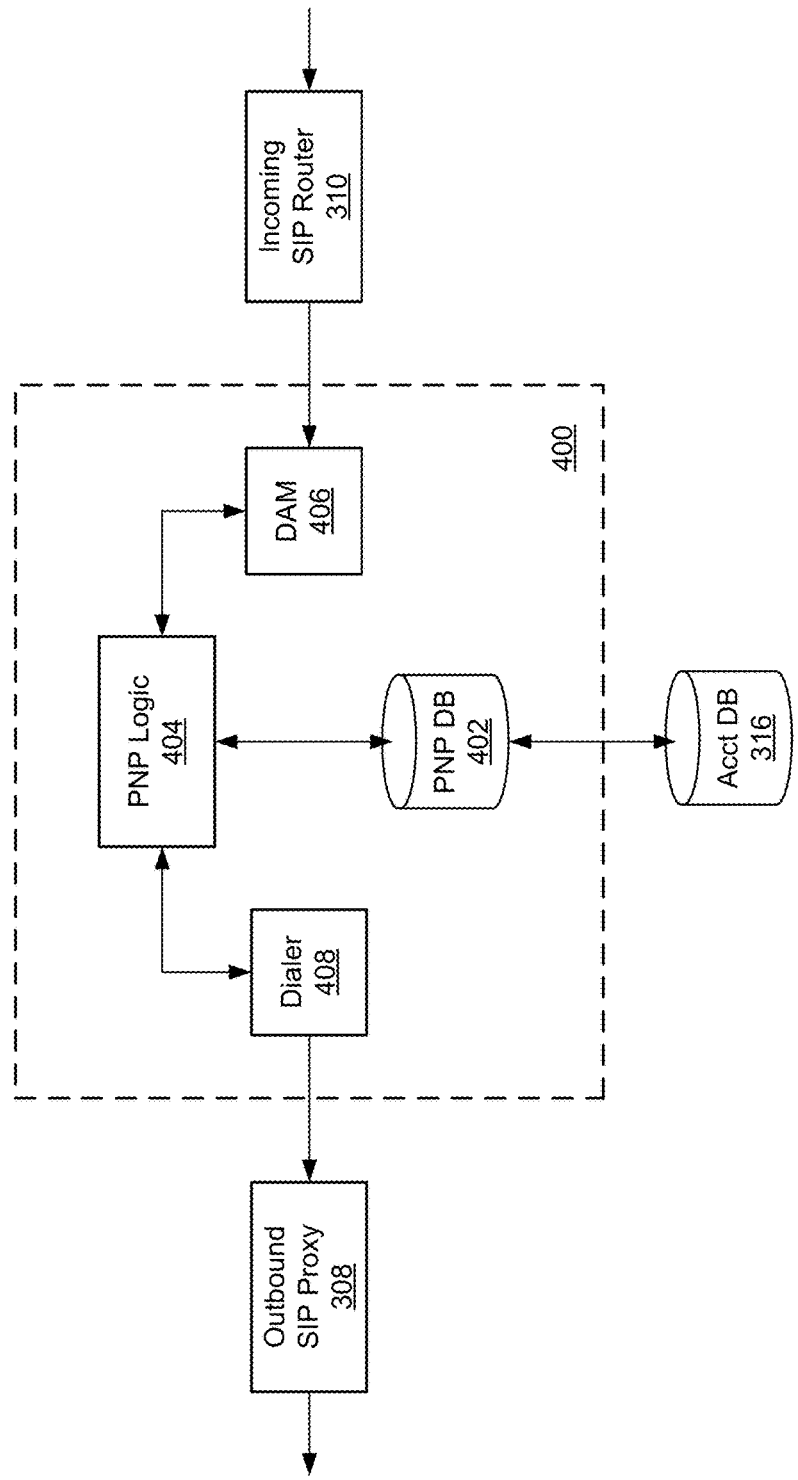
FIG. 4 is a simplified block diagram of a particular implementation of a phone number management system.
Figure 5:
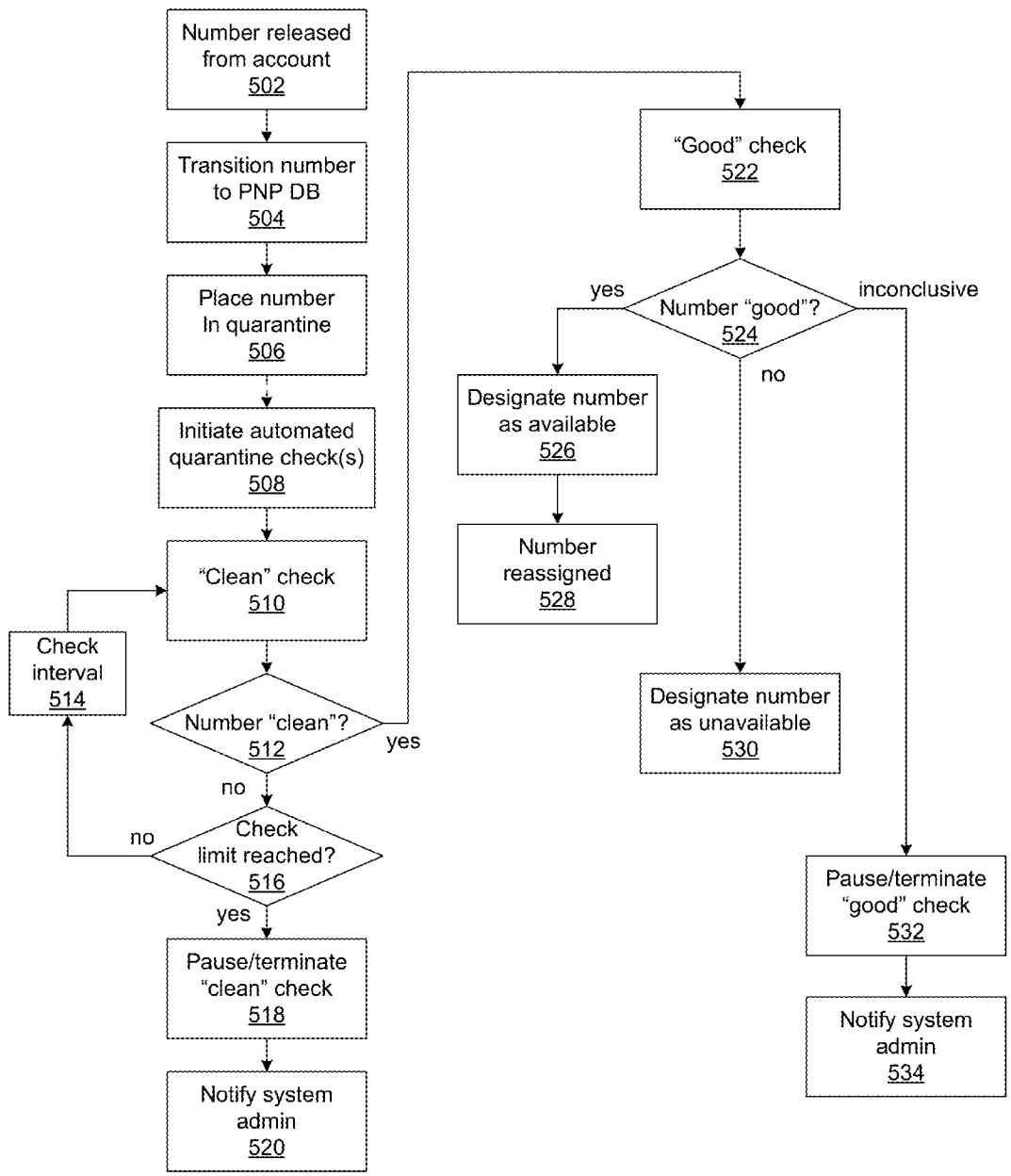
FIG. 5 is a flowchart illustrating operation of a particular implementation of a phone number management system.

According to various implementations, a phone number pool (PNP) is implemented in association with a telephony system that manages all phone numbers associated with the system including, for example, newly added numbers, quarantined numbers, numbers allocated on accounts (e.g., as reflected in account DB 316), numbers released from accounts, ported-in numbers, etc. The PNP may be implemented using one or more computing devices (e.g., servers) and associated data stores, and may be part of telephony services block 314 or implemented separately. A specific implementation of a PNP will now be described with reference to FIGS. 4-6.

PNP 400 has an associated PNP database 402 that stores all phone numbers (with corresponding attributes) managed by PNP logic 404. These attributes may include, for example, a geographic or service area, whether the number is toll free, a country ID, a provider and/or brand ID, an SMS availability ID, the date the number was added, etc. The attributes may also include historical information relating to phone number assignment and release events as well as user IDs. The attributes may also relate to quarantine lifecycle states. And although PNP logic 404 may implement a wide range of functionality relating to the management of phone numbers for a telephony system such as PBX platform 300 (e.g., phone number life-cycle management), the following discussion will focus primarily on the quarantine and reassignment of phone numbers in such a system.

When a phone number is released from an account (502) it is transitioned from an account database (e.g., account DB 316) to PNP database 402 (504). This may be done each time a number is released from an account or it may be done in batch. The transition of each phone number to the PNP database is confirmed in the account database. In some cases, information in the account database may be sent along with the released numbers (e.g., release time, user ID, etc.). The released phone number is placed in quarantine (506) during which time it is unavailable for allocation to an account.

As mentioned above, one or more automated checks are performed for a quarantined phone number to determine whether it may be reassigned to another account. According to a particular implementation, the check(s) begin(s) at a configurable time before the end of the quarantine period. This may be at any point during the quarantine period, i.e., early on or near the end of the period. Thus, it is possible that all checks may be completed before the end of the quarantine period so that a phone number may be confidently reassigned immediately or soon after quarantine ends. It should be noted, however, that implementations are contemplated in which one or more such checks may be completed or even initiated after expiration of the quarantine period.

Referring again to FIGS. 4 and 5, after initiation of the automated check(s) for a particular phone number is triggered (508), PNP logic 404 initiates a check to determine whether the phone number is "clean" (510), i.e., unlikely to receive calls directed to the subscriber or end point of the account to which it was previous assigned. According to some implementations, this includes counting incoming calls directed to the phone number during one or more "dirty determination periods" (DDPs), the duration of which is configurable.

If the phone number is not determined to be "clean" during the DDP (512), PNP logic 404 waits a configurable period of time (514) before initiating another DDP. The number of DDPs may also be configurable to ensure the process does not enter an endless loop. For example, if a configurable number of consecutive DDPs are completed without a determination that the phone number is "clean" (516), the process may be paused or terminated (518) and a notification may be sent to a system administrator (520). The system administrator may then make a decision about whether or not further checks should be initiated for that phone number.

According to a particular implementation in the context of PBX platform 300, all calls received by Incoming SIP Router 310 that are directed to phone numbers not in the global user directory (e.g., GUD 215A of FIG. 2) are routed to Default Answering Machine (DAM) 406. DAM 406, which may be implemented as a telephony application (e.g., one of telephony applications 325 or 325), plays standard greetings (e.g., based on regional settings) and registers received calls for storage in the system's call log database (e.g., call log DB 320). DAM 406 also provides information regarding the logged calls to PNP logic 404 for the purpose of counting the calls to quarantined numbers. This information might include, for example, the time of the incoming call, the source phone number from which the call originated, and the phone number that received the call.

Figure 6:
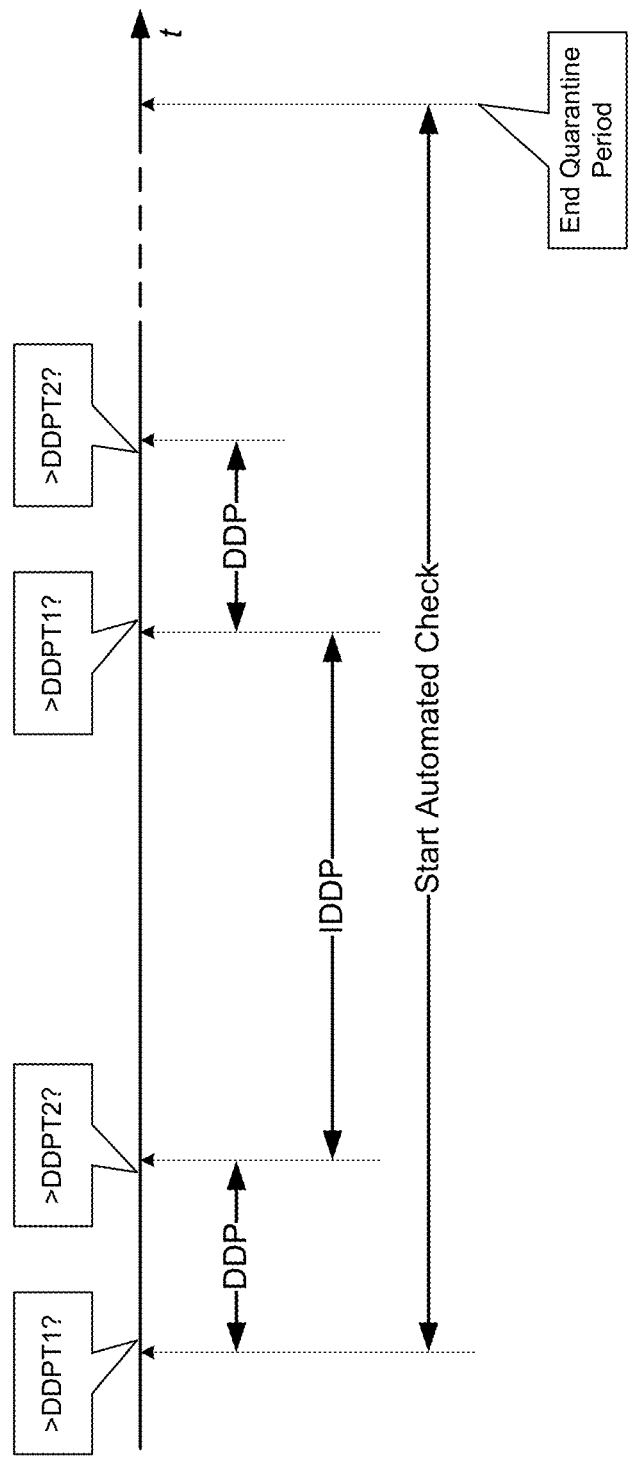
FIG. 6 is a timeline diagram illustrating part of the operation of a particular implementation of a phone number management system.

According to a particular implementation, incoming calls to the phone number are counted during multiple periods within the DDP as illustrated in FIG. 6. This might be, for example, on the first and last days of the DDP. In order to be considered "clean" in this example, the number of calls on the first day of the DDP must be lower than a corresponding configurable threshold (DDPT1), and the number of calls on the last day of the DDP must also be lower than a corresponding configurable threshold (DDPT2). Typically, the first threshold would be higher than the second. In some cases, the second threshold may be configured to require that no calls are received. If both conditions are met, the status of phone number in PNP database 402 is set to "clean." If either or both are not met, another DDP is scheduled after a delay interval (IDDP) during which the check repeats. As mentioned above, this may occur until the number is "clean" or some configurable number of times after which the process is paused or terminated at which point a system administrator might be notified. It should be noted that the number and timing of count periods within a DDP, the number and levels of the thresholds, and the conditions corresponding to a "clean" phone number may vary without departing from the scope of this disclosure. For example, only a single count and a single threshold might be used during the DDP. Alternatively, more than two counts and thresholds might be used.

It should also be noted that the various configurable parameters related to determining whether phone numbers are "clean" or "dirty" can be set to different values for different subsets of the phone numbers associated with the telephony system. For example, a telephony system might have different "brands" for different partner telephony providers with which the different subsets of phone numbers are associated and which have different quarantine periods and/or requirements. The ability to configure phone number management parameters differently for different subsets of numbers would allow for the telephony system to specify different rule sets for the quarantine of phone numbers for different brands and to fine tune the operation of PNP logic 404 to best meet the requirements of each.

Once the status of a phone number is set to "clean" (512), PNP logic 404 initiates a check to determine whether the phone number is "good" (522), i.e., whether it is still available for reassignment in the telephony system. If the phone number is determined to be "good" (524), PNP logic 404 designates the number as available for reassignment within the telephony system (526) after which the number may be reassigned to a new or existing account (528). This may be accomplished in a variety of ways. For example, a number might be reassigned automatically. Alternatively, a number can be reassigned manually via an administration interface. As yet another alternative, a customer or end user might select the number via a telephony service interface, e.g., filtering for vanity numbers. Once selected for reassignment, the number is transferred to an account DB via the platform API.

If the phone number is determined to be "bad" (524), PNP logic 404 designates the phone number as no longer available for assignment within the telephony system (530), e.g., the number may be discarded. If the determination is inconclusive (524), the process may be paused or terminated (532) and a notification may be sent to a system administrator (534). The system administrator may then make a decision about whether or not further checks should be initiated for that phone number.

According to a particular implementation, determining whether a phone number is "good" is done by making one or more call attempts to the phone number from one or more numbers external to the telephony system and determining whether each call is received by the system. The call attempts may be made using one or more external providers to ensure that the call attempts are not internal to the telephony system. According to the implementation illustrated in FIG. 4, this may be done using Dialer 408 to initiate the call attempts (e.g., via Outbound SIP Proxy 308) and DAM 406 to register the received calls (e.g., from Incoming SIP Router 310). Dialer 408 is a scheduled SIP-based application that receives the number from PNP logic 404, makes the call attempts using a special preconfigured external number, and sends response events back to PNP logic 404 about each call attempt. The call attempts should be directed to DAM 406 by Incoming SIP Router 310 if they are still associated with the system and not in the global user directory. As with DAM 406, Dialer 408 may be implemented as a telephony application (e.g., applications 324 and 325). If a sufficient number of successful call attempts occur in a row (e.g., 3 consecutive attempts), the number is labeled "good." If a sufficient number of call attempts in a row fail (e.g., 2 consecutive attempts), the number is labeled "bad," i.e., it is determined to no longer be available for assignment within the system and may be discarded. Alternatively, implementations are contemplated in which, if a sufficient proportion or percentage of the call attempts are successful the number may be labeled "good."

The number of call attempts and the interval between call attempts may be configurable. For example, the number of call attempts can be limited such that, if the limit is reached without a determination one way or the other, a notification is sent to the administrator who can make a decision, e.g., discard the phone number, restart the process, perform a manual check of the number, etc. According to some implementations, PNP logic 404 is configured to detect situations in which the call attempts result in one or more specified patterns of successful and failed attempts, e.g., alternating between success and failure a specified number of times, near 50% failure rate, etc. If a specified pattern is detected, a notification can be sent to the administrator (even before any specified call attempt limit has been reached), giving the administrator the option to make a decision on what should be done.

As will be appreciated from the foregoing, the process for determining whether most phone numbers associated with a telephony system are "clean" and "good" and making the numbers available for reassignment can be accomplished automatically with little or no administrator intervention. This can significantly reduce the manual administrative overhead associated with the management of phone number quarantine while at the same time increasing confidence that reassigned numbers will not result in a poor customer experience.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, reference to particular protocols herein are merely by way of example. Suitable alternatives or those later developed known to those of skill in the art may be employed without departing from the scope of the invention.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for managing phone numbers associated with a telephony system, the method comprising:
    counting calls received by the telephony system that are directed to a first phone number associated with the telephony system, the first phone number having been placed in quarantine for a first quarantine period;
    causing a plurality of call attempts to be made to the first phone number from one or more test phone numbers; and
    where a first number of the calls received is below a threshold, a second number of the call attempts are successfully routed to the telephony system, and the first quarantine period for the first phone number has expired, designating the first phone number as available for reassignment in the telephony system.

2. The method of claim 1, further comprising:
    counting calls received by the telephony system that are directed to a second phone number associated with the telephony system, the second phone number having been placed in quarantine for the first quarantine period, counting the calls directed to the second phone number including counting a first subset of the calls directed to the second phone number during a first portion of a first period of time, and counting a second subset of the calls directed to the second phone number during a second portion of the first period, the second portion of the first period being later than the first portion of the first period;
    comparing a third number of the calls received during the first portion of the first period with a first threshold; and
    comparing a fourth number of the calls received during the second portion of the first period with a second threshold, the second threshold being lower than the first threshold.

3. The method of claim 2, further comprising, where the third number exceeds the first threshold or the fourth number exceeds the second threshold, repeating counting the calls directed to the second phone number after an interval of time.

4. The method of claim 3, further comprising, after repeating counting the calls directed to the second phone number a specified number of times, generating a notification to a representative of the telephony system.

5. The method of claim 2, further comprising, where the third number is below the first threshold and the fourth number is below the second threshold, causing a plurality of call attempts to be made to the second phone number from the one or more test phone numbers.

6. The method of claim 1, wherein counting the calls directed to the first phone number begins a specified period of time before an end of the first quarantine period.

7. The method of claim 1, wherein the second number of the call attempts successfully routed to the telephony system are consecutive.

8. The method of claim 1, further comprising:
    causing a plurality of call attempts to be made to a second phone number associated with the telephony system from the one or more test phone numbers, the second phone number having been placed in quarantine for the first quarantine period; and
    where the second number is not reached within a third number of the call attempts to the second phone number, terminating the call attempts to the second phone number.

9. The method of claim 1, further comprising:
    causing a plurality of call attempts to be made to a second phone number associated with the telephony system from the one or more test phone numbers, the second phone number having been placed in quarantine for the first quarantine period; and
    where a specified pattern of successful and unsuccessful call attempts to the second phone number occurs, generating a notification to a representative of the telephony system.

10. A telephony system, comprising:
    one or more data stores having account data stored therein, the account data associating a plurality of phone numbers of the telephony system with a plurality of accounts;
    one or more computing devices configured to:
        disassociate a first phone number of the plurality of phone numbers from a first account of the plurality of accounts;
        quarantine the first phone number for a first quarantine period;
        count calls received by the telephony system that are directed to the first phone number;
        cause a plurality of call attempts to be made to the first phone number from one or more test phone numbers; and where a first number of the calls received is below a threshold, a second number of the call attempts are successfully routed to the telephony system, and the first quarantine period for the first phone number has expired, designate the first phone number as available for reassignment in the telephony system.

11. The system of claim 10, wherein the one or more computing devices are further configured to:
disassociate a second phone number of the plurality of phone numbers from a second account of the plurality of accounts;
quarantine the second phone number for the first quarantine period;
count calls received by the telephony system that are directed to the second phone number, including counting a first subset of the calls directed to the second phone number during a first portion of a first period of time, and counting a second subset of the calls directed to the second phone number during a second portion of the first period, the second portion of the first period being later than the first portion of the first period;
compare a third number of the calls received during the first portion of the first period with a first threshold; and
compare a fourth number of the calls received during the second portion of the first period with a second threshold, the second threshold being lower than the first threshold.

12. The system of claim 11, wherein the one or more computing devices are further configured to, where the third number exceeds the first threshold or the fourth number exceeds the second threshold, repeat counting the calls directed to the second phone number after an interval of time.

13. The system of claim 12, wherein the one or more computing devices are further configured to, after repeating counting the calls directed to the second phone number a specified number of times, generate a notification to a representative of the telephony system.

14. The system of claim 11, wherein the one or more computing devices are further configured to, where the third number is below the first threshold and the fourth number is below the second threshold, cause a plurality of call attempts to be made to the second phone number from the one or more test phone numbers.

15. The system of claim 10, wherein the one or more computing devices are configured to begin counting the calls directed to the first phone number a specified period of time before an end of the first quarantine period.

16. The system of claim 10, wherein the second number of the call attempts successfully routed to the telephony system are consecutive.

17. The system of claim 10, wherein the one or more computing devices are further configured to:
disassociate a second phone number of the plurality of phone numbers from a second account of the plurality of accounts;
quarantine the second phone number for the first quarantine period;
cause a plurality of call attempts to be made to the second phone number from the one or more test phone numbers; and
where the second number is not reached within a third number of the call attempts to the second phone number, terminate the call attempts to the second phone number.

18. The system of claim 10, wherein the one or more computing devices are further configured to:
disassociate a second phone number of the plurality of phone numbers from a second account of the plurality of accounts;
quarantine the second phone number for the first quarantine period;
cause a plurality of call attempts to be made to the second phone number from the one or more test phone numbers; and
where a specified pattern of successful and unsuccessful call attempts to the second phone number occurs, generate a notification to a representative of the telephony system.

19. The system of claim 10, wherein the one or more computing devices are further configured to associate the first phone number with a second account of the plurality of accounts once the first phone number has been designated for reassignment.

20. The system of claim 10, wherein the first quarantine period is specified for a first set of the accounts including the first account, and a second quarantine period is specified for a second set of the accounts, the second quarantine period being different from the first quarantine period, the first and second sets of accounts being non-overlapping, and wherein the one or more computing devices are further configured to:
disassociate a second phone number of the plurality of phone numbers from the first account;
quarantine the second phone number for the second quarantine period; and
associate the second phone number with a second account of the plurality of accounts, the second being included in the second set of accounts.

* * * * *